United States Patent
McNaughton

(10) Patent No.: US 8,047,451 B2
(45) Date of Patent: Nov. 1, 2011

(54) WINDSHIELD HEAT AND CLEAN

(75) Inventor: Patrick James McNaughton, Plymouth, MN (US)

(73) Assignee: McNaughton Incorporated, Plymouth, MN (US)

( * ) Notice: Subject to any disclaimer, the term of this patent is extended or adjusted under 35 U.S.C. 154(b) by 636 days.

(21) Appl. No.: 10/599,920

(22) PCT Filed: Apr. 14, 2005

(86) PCT No.: PCT/US2005/012685
§ 371 (c)(1),
(2), (4) Date: Jun. 28, 2007

(87) PCT Pub. No.: WO2005/104690
PCT Pub. Date: Nov. 10, 2005

(65) Prior Publication Data
US 2007/0295825 A1    Dec. 27, 2007

Related U.S. Application Data

(60) Provisional application No. 60/562,717, filed on Apr. 16, 2004.

(51) Int. Cl.
F24D 5/00 (2006.01)
B05B 1/10 (2006.01)
B60S 1/46 (2006.01)

(52) U.S. Cl. ............... 237/12.3 B; 239/284.1; 239/128; 239/130; 239/135; 219/202; 219/203; 137/599.14; 237/12.4

(58) Field of Classification Search ................. 239/128, 239/130, 133, 135, 139, 284.1; 219/202, 219/203; 138/37, 38; 237/12.3 B
See application file for complete search history.

(56) References Cited

U.S. PATENT DOCUMENTS

| | | | | |
|---|---|---|---|---|
| 2,756,032 | A * | 7/1956 | Dowell | 165/121 |
| 2,929,408 | A * | 3/1960 | Smith et al. | 138/38 |
| 3,200,848 | A * | 8/1965 | Takagi | 138/38 |
| 3,359,616 | A * | 12/1967 | Butt | 29/890.039 |
| 3,877,514 | A * | 4/1975 | Beck | 165/286 |
| 3,888,412 | A * | 6/1975 | Lindo | 237/12.3 B |
| 4,090,668 | A * | 5/1978 | Kochenour | 239/130 |
| 4,163,474 | A * | 8/1979 | MacDonald et al. | 165/179 |
| 4,354,548 | A * | 10/1982 | Carlsson | 165/41 |
| 4,562,890 | A * | 1/1986 | Matoba | 165/41 |
| 4,694,891 | A * | 9/1987 | Okumura et al. | 165/41 |
| 4,877,186 | A * | 10/1989 | Scholl | 239/75 |
| 4,893,670 | A * | 1/1990 | Joshi et al. | 165/154 |
| 5,183,099 | A * | 2/1993 | Bechu | 165/41 |
| 5,375,654 | A * | 12/1994 | Hougland et al. | 165/109.1 |
| 5,509,606 | A | 4/1996 | Breithaupt | 239/130 |
| 5,803,600 | A * | 9/1998 | Schubert et al. | 366/144 |
| 5,950,715 | A * | 9/1999 | Jonsson et al. | 165/103 |
| 6,116,290 | A * | 9/2000 | Ohrn et al. | 138/149 |
| 6,133,546 | A * | 10/2000 | Bains | 219/202 |
| 6,266,842 | B1 * | 7/2001 | Muller | 15/250.01 |
| 6,283,159 | B1 * | 9/2001 | Tada | 138/116 |
| 6,349,976 | B1 * | 2/2002 | Taylor, Jr. | 285/123.1 |
| 6,364,010 | B1 * | 4/2002 | Richman et al. | 165/202 |
| 6,669,109 | B2 * | 12/2003 | Ivanov et al. | 239/284.1 |
| 6,902,118 | B2 * | 6/2005 | Shank et al. | 239/13 |
| 7,044,210 | B2 * | 5/2006 | Usui | 165/177 |

* cited by examiner

*Primary Examiner* — Dinh Q Nguyen
*Assistant Examiner* — James S Hogan
(74) *Attorney, Agent, or Firm* — Fredrikson & Byron, PA

(57) ABSTRACT

A washer fluid heater apparatus in embodiments of the invention may include one or more of the following features: (a) a heat exchanger having a washer fluid inlet to allow washer fluid to enter the heat exchanger and a washer fluid outlet to allow the washer fluid to exit the heat exchanger; and (b) a coolant passage traversing through the heat exchanger having a coolant inlet and a coolant outlet, the coolant inlet and coolant outlet operably coupled to an engine's coolant system to allow passage of engine coolant through the heat exchanger.

20 Claims, 17 Drawing Sheets

WINDSHIELD HEAT AND CLEAN

CROSS-REFERENCE TO RELATED APPLICATIONS

The present application claims priority to International Application No. PCT/US2005/012685 filed 14 Apr. 2005, which in turn claims priority to U.S. provisional Application No. 60/562,717 filed 16 Apr. 2004, the teachings of all of which are incorporated herein by reference.

FIELD OF THE INVENTION

The present invention relates to a heating system for vehicle windshield wipers, and more specifically to a windshield wiper fluid heating system utilizing engine heat to heat the windshield wiper fluid.

BACKGROUND OF THE INVENTION

Windshield wipers are a standard feature on the majority of motor vehicles in use today, and are used to clear vehicle windows of various types of dirt and debris. For windshield wipers to function properly, they must be supplied with a jet of windshield wiper fluid that helps to dissolve the dirt and debris and carry the material off of the window, assisted by the motion of the windshield wipers. If not cleaned, dirty windshields in motorized vehicles can seriously impair a driver's field of vision. Effective windshield wipers are particularly important in the trucking industry, where large vehicles with heavy loads are operated for extensive periods, creating significant safety and liability issues.

While conventional windshield wiper systems operate effectively under normal conditions, they can become ineffective when confronted with either cold ambient temperatures that cause the wiper fluid to freeze on the vehicle window, or particularly troublesome material such as impacted insects or road grime that are difficult to remove. Application of wiper fluid to a cold windshield can be particularly disastrous, as the sudden formation of a layer of frozen fluid on the windshield can render the windshield completely opaque.

Various devices and methods have been used in the art to provide a spray of heated wiper fluid onto the windows of a vehicle. For example, most vehicles are equipped with a defrost feature that blows hot air inside the vehicle and onto the windshield. This, however, is a relatively inefficient and slow way of heating the windshield. Others have tried to heat windshield wiper fluid using electrical devices, such as heat elements, and in some cases have combined these with other pumps and distribution systems. See, for example, U.S. Pat. No. 5,509,606, which describes a container into which washing fluid from a reservoir is pumped and in which the fluid is electrically heated by an electric element before spraying onto a windshield. U.S. Pat. No. 4,090,668 provides another example, which describes a windshield washing and de-icing system in which a pump transfers washer fluid from a reservoir into a container. Heated engine coolant is passed through a conduit in the reservoir, and an electric resistance wire further heats the fluid whenever the temperature drops below a minimum value.

These systems, and others found in the art, are generally expensive, cumbersome to install, and may require drilling and modifications to the vehicle chassis. Furthermore, they require electrical current, generally from the vehicle's battery, which may decrease the life expectancy of the vehicle's battery and may result in the battery not having sufficient energy to start the car under cold conditions. Use of electrical current is also inefficient, and there is often a significant delay from the time the unit is activated to the point where hot fluid is actually generated. The hot fluid volume generated by these procedures is minimal, and there may be an additional warming delay between each activation.

SUMMARY OF THE INVENTION

The present invention discloses a washer fluid heater system that harnesses energy lost in the form of heat from the vehicle's engine. The washer fluid heater system utilizes a heat exchanger that is installed into the engine's coolant system, either in the heat core circuit or a circuit otherwise connected to the coolant system. The heat exchanger operates without the need for electricity. The temperature of the washer fluid is increased by the passage of hot engine coolant fluid through heat exchange elements, and is thus related to the temperature of coolant flowing through the vehicle's engine. Generally, the normal operating temperature of the engine coolant is between about 150° and 220° F. Installation of the washer fluid heater system does not require modification to the vehicle, and is activated automatically when the vehicle's driver engages the factory installed windshield wiper system. Since the heat exchanger can increase the temperature of washer fluid to temperatures close to those of the hot engine coolant, the washer fluid heating system can melt snow, ice, and frozen matter on the vehicle window and wipers, and can also help dissolve and remove difficult window debris such as road grime and insects. Further, some embodiments of the washer fluid heater system release vapor onto the vehicle window or the washer fluid reservoir in order to preheat these areas and further facilitate operation of the window cleaning system.

It is considerably less expensive than other systems on the market, can be installed quickly using only hand tools, and does not compromise the integrity of the vehicle's electric system. For example, as it does not draw off battery power, it does not have the chance of creating a dead battery if the system is misused or malfunctions. The invention can be readily disassembled and cleaned for maintenance. Finally, particular embodiments of the invention are also readily adaptable to provide varying levels of performance depending on the environment in which the vehicle is typically used.

A washer fluid heater apparatus in embodiments of the invention may include one or more of the following features: (a) a heat exchanger having a washer fluid inlet to allow washer fluid to enter the heat exchanger and a washer fluid outlet to allow the washer fluid to exit the heat exchanger; and (b) a coolant passage traversing through the heat exchanger having a coolant inlet and a coolant outlet, the coolant inlet and coolant outlet operably coupled to an engine's coolant system to allow passage of engine coolant through the heat exchanger. The coolant inlet may receive coolant directly from the engine or from a water pump. The coolant inlet and the washer fluid outlet may be located on a first end of the heat exchanger and the coolant outlet and the washer fluid inlet may be located on a second end of the heat exchanger to ensure the coolant and the washer fluid flow in opposite directions to insure efficient heat transfer. Alternatively, the coolant inlet can be operably coupled to a heater core inlet and the coolant outlet can be operably coupled to a heater core outlet to create a parallel engine coolant flow with the heater core. A thermostat can then be operably coupled to the washer fluid heater to control when the washer fluid heater is powered on. Alternatively, the heat exchanger may have a reservoir with a washer fluid channel that may include one or more fins extending from a radial exchange element to provide effective heat transfer. The washer fluid outlet may be operably coupled to the reservoir and the washer fluid inlet may be operably connected to the heat exchanger to input the washer fluid to contact the washer fluid channel. The washer fluid channel may have channels defined by fins that touch the heat exchanger jacket, where the fins have an opening between every other fin to allow the washer fluid to pass through the opening to the adjacent channel. Alternatively, the heat exchanger may be without a reservoir and instead have the washer fluid channel with channels defined by fins of the radial exchange element that touch an outside wall of the heat exchanger. The fins may have an opening between every other fin that allows the washer fluid to pass to an adjacent channel. The washer fluid inlet may be operably coupled to an inlet channel and the washer fluid outlet is operably coupled to an outlet channel where a thermal barrier may be between the inlet channel and the outlet channel.

A window washing system for a motor vehicle in embodiments of the invention may include one or more of the following features: (a) nozzle means located adjacent to a vehicle window for directing washer fluid against the window, (b) an external reservoir for containing washer fluid, (c) a heat exchanger having an inlet connected to said chamber and an outlet connected to said nozzle means, (d) pumping means for transferring washer fluid from said chamber into said heat exchanger and from said heat exchanger to said nozzle means, and (e) means for circulating coolant from a motor cooling system into the heat exchanger with the washer fluid inside to thereby heat the washer fluid. An embodiment of the heat exchanger referred to herein as a plate heat exchanger may have a channel plate and a first planar exchange element that are held together by a fastening means. The channel plate allows the passage of coolant from the heat exchanger inlet to the heat exchanger outlet and the first planar exchange element contains a washer fluid passage to route washer fluid through the exchange element to transfer heat from the engine coolant. Alternatively, the plate heat exchanger may have a second planar exchange element held to the channel plate by a fastening means opposite the first planar exchange element. In this embodiment, the channel plate has a washer fluid passage for washer fluid to pass from the first wiper plate fluid passage to the second wiper plate fluid passage. Alternatively, the channel plate may have a plurality of planar exchange elements held to it by a fastening means where the planar exchange elements may have a cover plate to enclose the washer fluid passages. The washer fluid passages may have a spiral passage with imperfections within the passageways to create fluid turbulence. Alternatively, the heat exchanger may have a coolant plate having an upper surface with a coolant passageway for the engine coolant and a lower surface having a washer fluid passageway for the washer fluid, where the engine coolant and the washer fluid flow in different directions within their respective passageways to provide effective heat transfer. A check valve may be operably coupled to the washer fluid inlet to prevent washer fluid from traversing back to the chamber. Additionally, the chamber may be located at a height above the heat exchanger to prevent washer fluid from traversing back to the chamber. A pressure valve may also be used to activate a piston that shuts off the flow of the coolant into the heat exchanger when the fluid within the heat exchanger reaches a certain temperature.

A washer fluid heater apparatus in embodiments of the invention may include one or more of the following features: (a) a heat exchanger having a washer fluid inlet to allow washer fluid to enter the heat exchanger and a washer fluid outlet to allow the washer fluid to exit the heat exchanger, and (b) a coolant passage traversing through the heat exchanger having a coolant inlet and a coolant outlet, the coolant inlet and coolant outlet operably coupled to an engine's coolant system to allow passage of engine coolant through the heat exchanger. The heat exchanger may have a bypass passage that allows engine coolant flow to bypass the coolant passage when the washer fluid becomes to hot using a thermal actuator which actuates a gate routing the engine coolant from the coolant passage to the bypass passage. The heat exchanger may also have a first chamber and a second chamber where the coolant passage runs adjacent to both the first and second chamber. As the washer fluid enters the heat exchanger it would first flow into the first chamber and then flow into the second chamber upon the first chamber being filled to prevent dilution of the heated mixture in the second chamber from mixing with the less heated mixture of the first chamber. In operation, the first chamber pre-heats the washer fluid and the second chamber post-heats the washer fluid to a useable level. The coolant passage passes adjacent to the first and second chambers. Alternatively, the heat exchanger may have a third chamber and the coolant passage runs adjacent to only the first chamber. The washer fluid inlet is operably coupled to the second chamber where the washer fluid is pre-heated by the first chamber, the washer fluid then flowing to the first chamber. The washer fluid outlet is operably coupled to the third chamber where the washer fluid flows from the first chamber and remains heated by the first chamber. Alternatively, the washer fluid inlet is operably coupled to the second chamber where the washer fluid is pre-heated by the first chamber and the washer fluid outlet is operably coupled to the first chamber where the washer fluid is post-heated. A pressure valve may be coupled to the washer fluid outlet and also coupled to a return washer fluid outlet operably coupled to the second chamber to return vaporized washer fluid to the second chamber.

Finally, an additional embodiment of the present invention utilizes a heat exchanger including a washer fluid coil that is immersed in engine coolant flowing through the coolant passage. Hot engine coolant flows through the heat exchanger, entering at the engine coolant inlet and leaving at the engine coolant outlet. Washer fluid enters the heat exchanger at the washer fluid inlet, where it enters the washer fluid coil.

DESCRIPTION OF VARIOUS EMBODIMENTS

Figure 1:
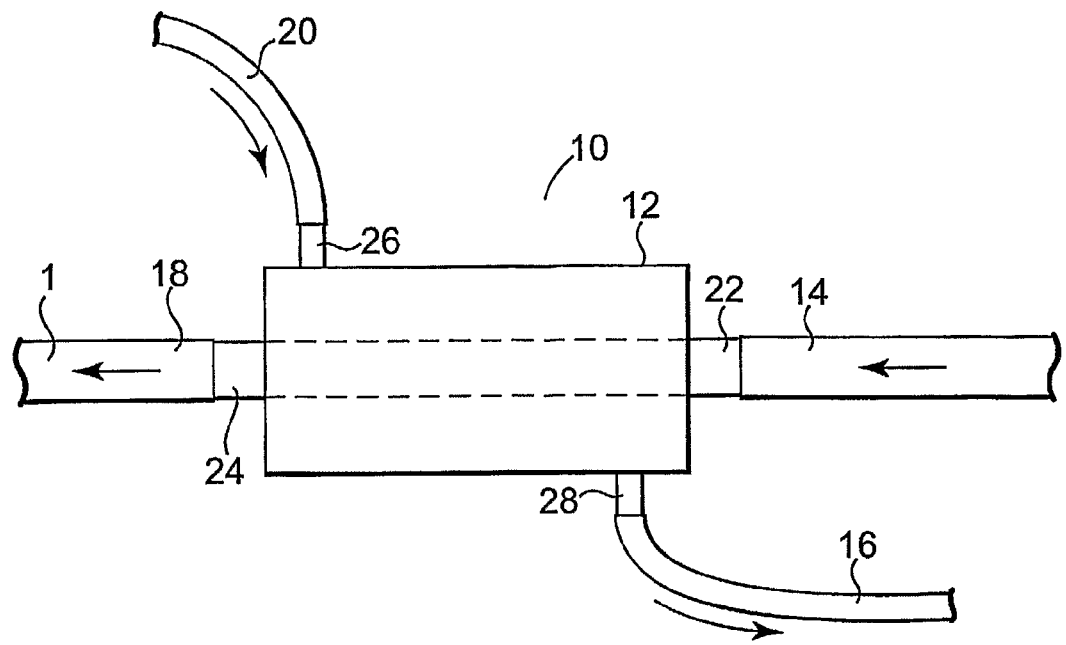
FIG. 1 is a diagrammatic side view of an embodiment of the washer fluid heating system of the present invention.

The following discussion is presented to enable a person skilled in the art to make and use the present teachings. Various modifications to the illustrated embodiments will be readily apparent to those skilled in the art, and the generic principles herein may be applied to other embodiments and applications without departing from the present teachings as defined by the appended claims. Thus, the present teachings are not intended to be limited to the embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives fall within the scope of the present teachings.

FIG. 1 is a diagrammatic side view of an embodiment of a washer fluid heating system of the present invention. The central device in the heating system is a heat exchanger 12. The heat exchanger 12 conducts heat from engine coolant that flows into the heat exchanger 12 along an engine coolant inflow line 14 to the washer fluid that then flows outwards through a washer fluid outflow line 16. The heat exchanger 12 may be provided with an insulating jacket (not shown) to minimize heat loss. The coolant lines are generally a ¾" or ⅝" hose, and washer fluid lines are generally ⅛" to 5/16", though various line widths for either are within the scope the present invention. The other end of the engine coolant inflow line 14 generally connects to the engine block or a water pump, which serves as the source of hot engine coolant. Other sources such as the vehicle's factory heating system can be used as well. Engine coolant leaves the heat exchanger 12 along an engine coolant outflow line 18. Washer fluid flows into the heat exchanger 12 along a washer fluid inflow line 20.

Figure 2:
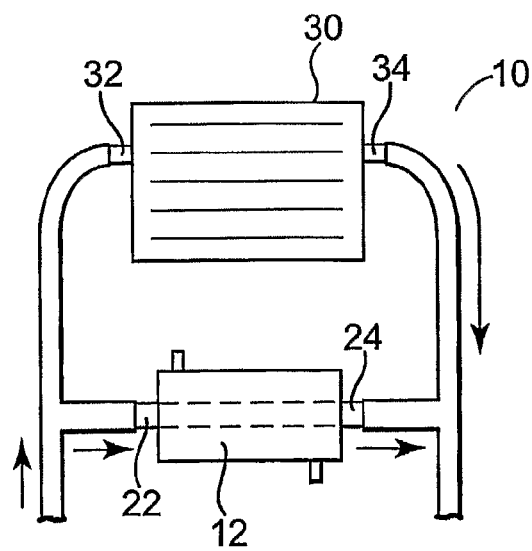
FIG. 2 is a diagrammatic side view of the washer fluid heating system with a heat exchanger connected in parallel with a heater core.

Preferably, the engine coolant flow and the washer fluid flow are in opposite directions, as counterflowing fluids have a greater velocity between them and hence a higher rate of heat transfer. In order to connect with the various fluid flow lines, the heat exchanger 12 has a number of inlets and outlets. These are the engine coolant inlet 22, the engine coolant outlet 24, the washer fluid inlet 26 and the washer fluid outlet 28. The heat exchanger 12 contains one or more reservoirs or channels that serve to provide a larger surface area to allow heat to be exchanged between the inflowing hot engine coolant and the washer fluid. FIG. 2 is a diagrammatic side view of the washer fluid heating system 10 with a heat exchanger connected in parallel with a heater core. In this figure, the heat exchanger 12 is installed such that the engine coolant inlet 22 and the heater core inlet 32 are on the same side of the washer fluid heating system 10. Likewise, the engine coolant outlet 24 and the heater core outlet 34 are on the same side as well. An advantage of a system laid out in this fashion is that there is a pressure drop as engine coolant flows through the heater core 30. Engine coolant will flow through both the heater core 30 and the heat exchanger 12 at a ratio determined by the resistance to flow at each point. This allows a thermostat (not shown) to be installed that will be able to shut off the heat exchanger 12 without affecting the heat being provided by the heater core 32.

Figure 3:
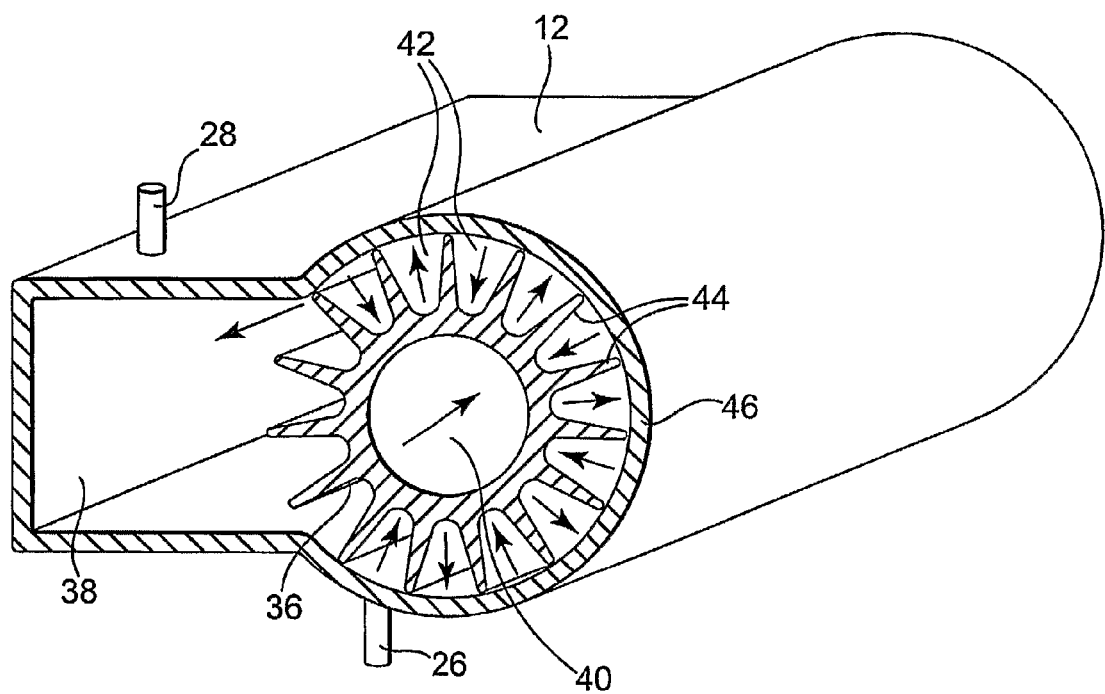
FIG. 3 is a perspective, cross-section view of an embodiment of a circumferential heat exchanger with first in, first out fluid flow along a radial exchange element and a reservoir.

FIG. 3 is a perspective, cross-section view of an embodiment of the heat exchanger 12 with first in, first out fluid flow along a radial exchange element 36 and a reservoir 38. Heat exchangers built corresponding to this design will be referred to herein as circumferential heat exchangers. Engine coolant flows through a coolant tunnel 40 within the radial exchange element 36, dissipating heat from the extensive surface area along the outside of the radial exchange element 36. This embodiment of the heat exchanger 12 combines two different types of heat exchange systems. One heat exchange system is the reservoir 38, while the other is a first in/first out (FIFO) system in which the radial exchange element 36 provides numerous washer fluid channels 42 and serves as a heat exchange interface. The washer fluid leaving the heat exchanger 12 is the washer fluid that has had the longest amount of time to absorb heat from the hot engine coolant. Cool washer fluid entering the heat exchanger 12 is not immediately diluted with warm washer fluid, thus creating a greater temperature gradient between the engine coolant and the entering washer fluid, encouraging a rapid increase in the temperature of the washer fluid. Washer fluid enters the heat exchanger 12 at the washer fluid inlet 26, into a washer fluid channel 42 formed by two adjacent fins 44 of the radial exchange element 36. Exchange elements such as the radial exchange element 36 are generally made from a metal such as aluminum, zinc, copper, and steel. The fins 44 extend outward to the heat exchanger jacket 46, forming a number of washer fluid channels 42 corresponding to the number of fins 44 used. The heat exchanger jacket 46 can be made of plastic, which is generally injection molded, thermal molded, or extruded. The heat exchanger jacket 46 is generally cylindrical in shape, though other shapes could be used so long as the radial exchange element 36 is built accordingly to provide an internal, alternating channel system, as would be clear to one skilled in the art. The washer fluid channels 42 run along the length of the heat exchanger 12. The endcaps (not shown) of the heat exchanger 12 contain openings positioned at the end of the fins 44, in an alternating fashion, so that washer fluid flows in a back and forth pattern along the washer fluid channels 42 so that it continuously absorbs heat from the hot engine coolant as the washer fluid circumnavigates the heat exchanger 12. Rather than providing openings on the endcaps, openings may instead be provided at alternating ends of the fins 44 themselves. The cross-sectional shape of the washer fluid channels 42 can vary from generally U-shaped shown in the figure. For example, the washer fluid channels 42 may have a V-shaped, or a generally square shaped, cross-section. However, a V-shaped channel is generally not ideal, as flow tends to avoid the crevice at the bottom of the V, leading to possible choking of the washer fluid channel 42 and generally less efficient heat transfer.

Figure 4:
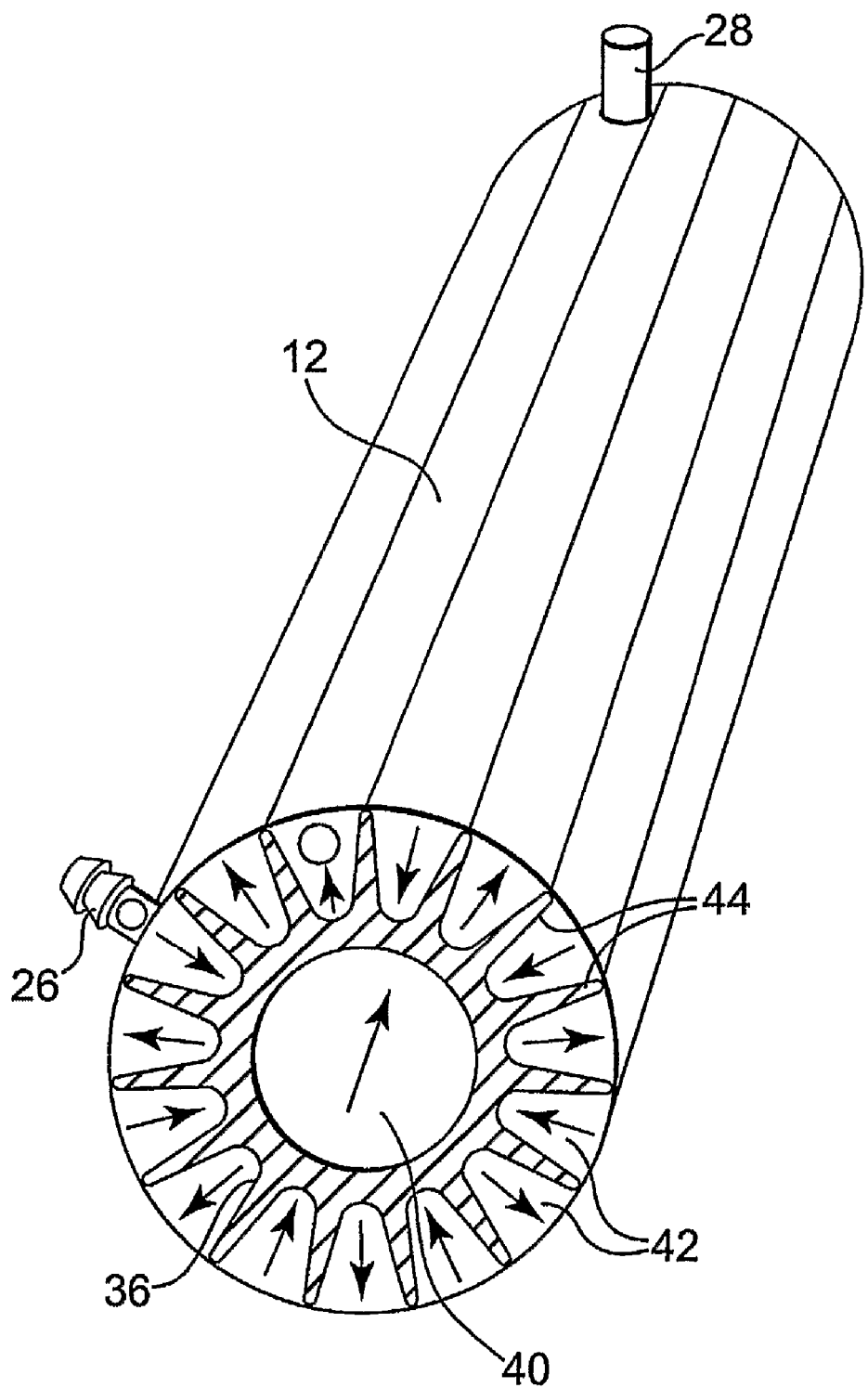
FIG. 4 is a perspective, cross-section view of an embodiment of the circumferential heat exchanger with first in, first out fluid flow along a radial exchange element.

Along one end of the heat exchanger 12 is a reservoir 38, which is a point where the heat exchanger jacket expands to form a space in which a significant quantity of hot washer fluid can be stored. The fins 44 preferably extend into the reservoir 38 to help maintain the temperature of the washer fluid, but need not extend all the way to the heat exchanger jacket 46 to form washer fluid channels 42. The washer fluid outlet 28 is positioned adjacent to the reservoir 38, and serves to enable the egress of heated washer fluid from this region. Note that washer fluid will circle the heat exchanger 12 only once, and will not re-enter the cooler stream of washer fluid entering at the washer fluid inlet 26, as this channel is blocked off by a fin 44 of the radial exchange element 36. A related aspect of the invention utilizes a heat exchanger 12 without a reservoir 38, as shown in FIG. 4. This heat exchanger 12 operates in the same fashion as the device shown in FIG. 3, but simply does not have a reservoir 38 in which heated washer fluid can accumulate.

Figure 5:
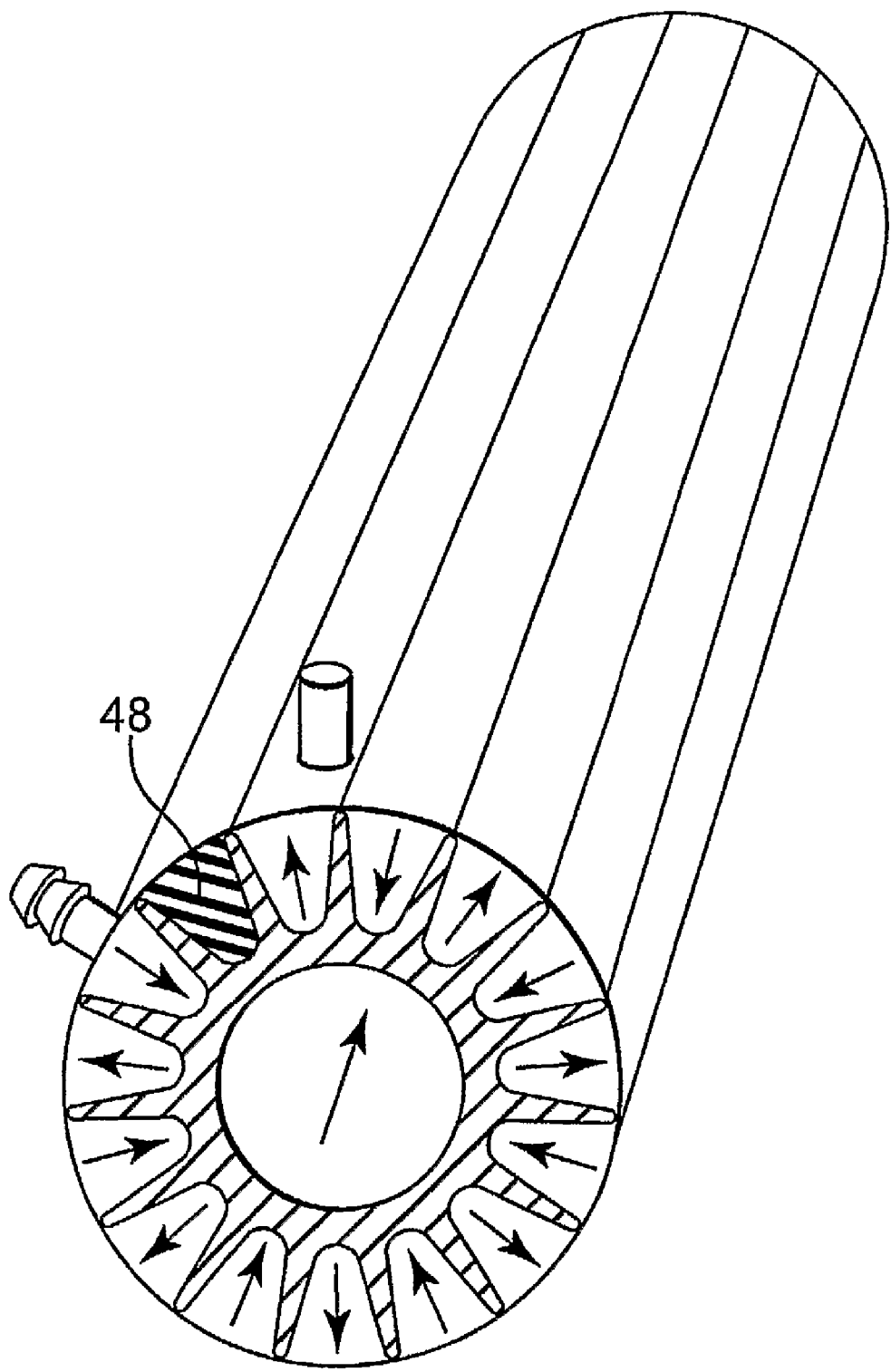
FIG. 5 is a perspective, cross-section view of an embodiment of the circumferential heat exchanger with first in, first out fluid flow along a radial exchange element including a thermal break.

One embodiment of the circumferential heat exchanger 12 adds a thermal break 48. FIG. 5 is a perspective, cross-section view of an embodiment of the heat exchanger with first in, first out fluid flow along a radial exchange element including a thermal break. Other than the thermal break 48, the heat exchanger 12 shown in FIG. 5 is generally similar that shown in FIG. 4. The thermal break 48 is an insulated channel, or the absence of a channel (essentially a very thick fin 44), that provides a barrier between the washer fluid channel 42 bearing the washer fluid inlet 26 and the washer fluid channel 42 bearing the washer fluid outlet 28. These two channels contain washer fluid at its coolest and hottest, respectively, and thus preferably do not share a common wall as heat could diffuse at this point, decreasing the performance of the heat exchanger 12. While FIG. 5 shows a thermal break 48 in a heat exchanger without a reservoir 38, a thermal break 48 can also be used in heat exchangers with a reservoir 38, in which case it should be positioned to isolate the reservoir 38 from the channel bearing the washer fluid inlet 26.

Figure 6:
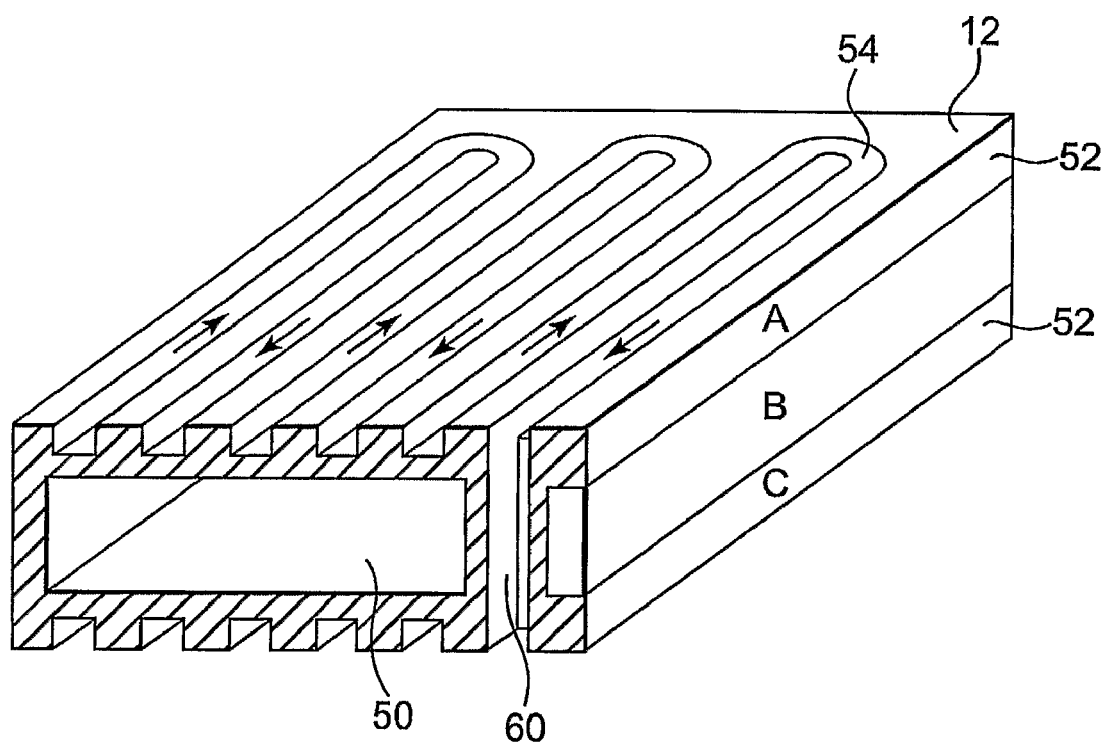
FIG. 6 is a perspective, cross-section view of an embodiment of the plate heat exchanger with first in, first out fluid flow in a plate system.
Figure 7:
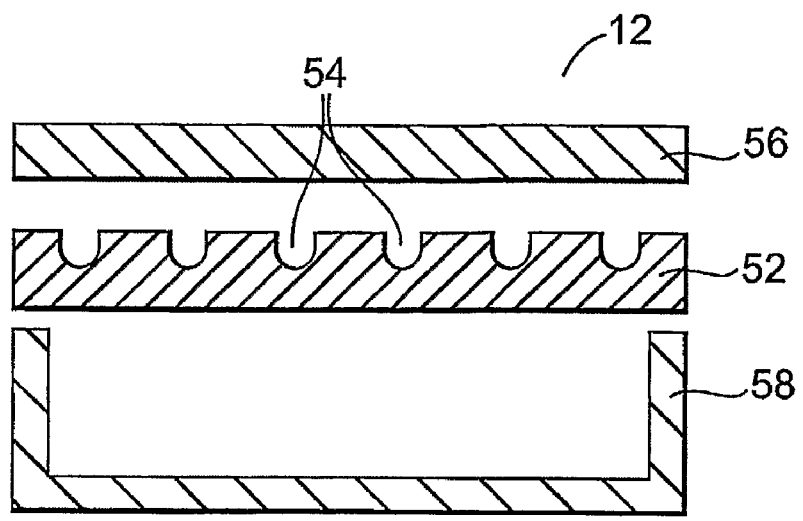
FIG. 7 is a cross-section view of an embodiment of the plate heat exchanger using a single planar exchange element.

An alternative to the circumferential heat exchangers 12 shown in FIGS. 3-5 is a plate heat exchanger 12. FIG. 6 is a perspective, cross-section view of an embodiment of the washer fluid heater with first in, first out fluid flow in a plate system. In a plate heat exchanger 12, engine coolant flows through a coolant channel 50. On one or both sides of the coolant channel 50 are planar exchange elements 52. The planer exchange elements each contain a winding washer fluid trench 54. The washer fluid trench 54 passes back and forth across the surface of the planar exchange element 52 to create a maximum length within a compact area. A cover plate 56 covers the planar exchange element 52 and the washer fluid trench 54, created an enclosed, snaking channel. The components used in an embodiment of the plate heat exchanger 12 are shown in FIG. 7, which provides a cross-section view of an embodiment of a plate heat exchanger 12 using a single planar exchange element 52. The plate heat exchanger 12 utilizes a washer fluid inlet 26 and a washer fluid outlet (not shown), which are positioned at the two ends of the washer fluid trench 54. If there is only a single planar exchange element 52, the inlet 26 and the outlet 28 will generally be positioned on the same side of the plate heat exchanger 12. If there are multiple planar exchange elements 52, the inlet 26 and the outlet 28 will generally be on opposite sides of the plate heat exchanger 12.

Figure 8:
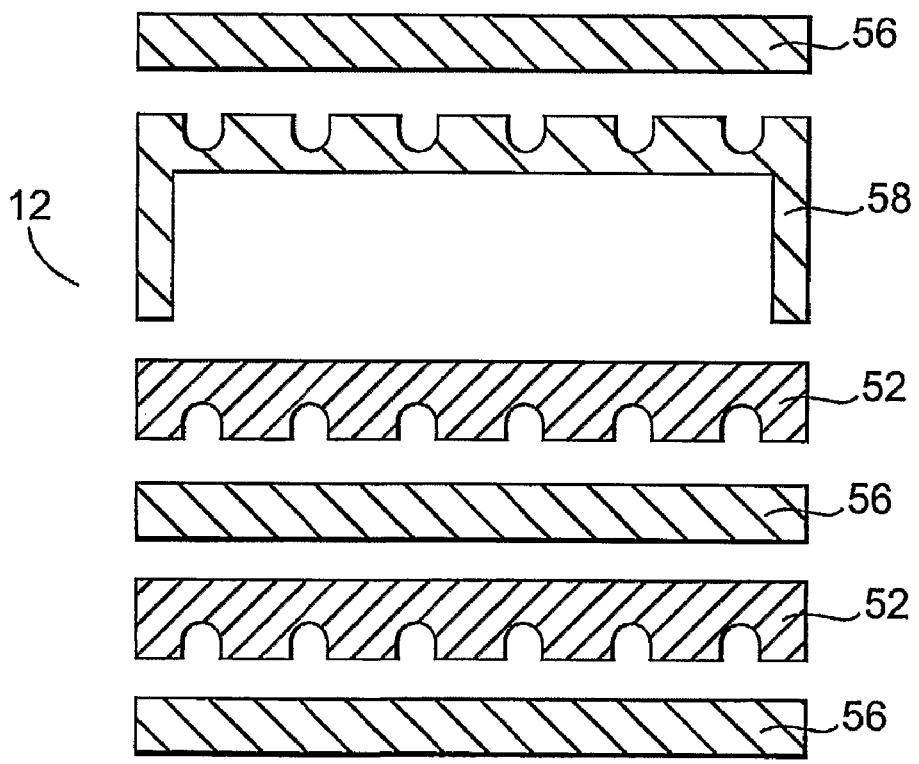
FIG. 8 is a cross-section view of an embodiment of the plate heat exchanger using multiple planar exchange elements.

The plate heat exchanger 12 can be manufactured by machining or casting the various plates that make up its structure. Each plate used in the system may be flat on one side, with indentation done on only one side of the plate. For example, the channel plate 58 need only contain a trench that will form a channel with the channel plate 58 secured to the bottom of a planar exchange element 52. The planar exchange element 52 contains the winding washer fluid trench 54 on one side only, and this is formed into a channel by securing a cover plate 56 over the top of the planar exchange element 52. The plates may be connected by bolting them together, or by various other means known to those skilled in the art. Gaskets or O-rings may be used to provide a good seal between adjacent plates. An embodiment of the plate heat exchanger 12 is shown in FIG. 8, which provides a cross-section view of an embodiment of the plate heat exchanger 12 using multiple planar exchange elements 52. This embodiment is more effective because it provides planar heat exchange elements 52 on both sides of the plate heat exchanger 12, which creates a greater surface area over which heat transfer can occur. There are a couple of noteworthy differences between plate heat exchangers with a single planar exchange element 52 and those with multiple planar exchange elements 52. First, a fluid transfer bridge 60 should be provided in order to allow washer fluid to move from the planar exchange element 52 on one side of the plate heat exchanger 12 to the planar exchange element 52 on the other side, to form one continuous channel. Preferably the fluid transfer bridge 60 is positioned such that it is perpendicular to the flow of the washer fluid. This creates turbulence, resulting in greater heat transfer. Second, it is generally preferable to form the second planar exchange element along the formerly flat outer side of the channel plate 58. While this results in a piece of material that must contain indentations on both sides, it has the advantage of providing more efficient heat exchange, as the hot engine coolant and the washer fluid will be flowing through the same piece of material.

As shown in FIG. 8, additional planar exchange elements 52 may be stacked on one or both sides of the plate heat exchanger 12. This type of stacking utilizes a modular design approach that enables the plate heat exchanger 12 to be configured to providing heating appropriate to various different environments and operating conditions. Essentially, the user can stack several copies of the modular planar exchange elements 52 to provide longer exposure to heated surfaces. For example, if a single plate provides, for example, 50 lineal inches, two plates will provide 100 lineal inches, and three plates 150 lineal inches. If operating in a very cold environment such as the Arctic, it would likely be desirable to use several stacked planar exchange elements 52 in order to provide greater lineal flow and thus greater heat transfer. Each stacked planar exchange element 52 is provided with an inlet and outlet so that fluid will flow smoothly from one planar exchange element to the next. Preferably, the washer fluid moves from colder, outer layers towards the hotter, inner layers in a stacked array.

Figure 9:
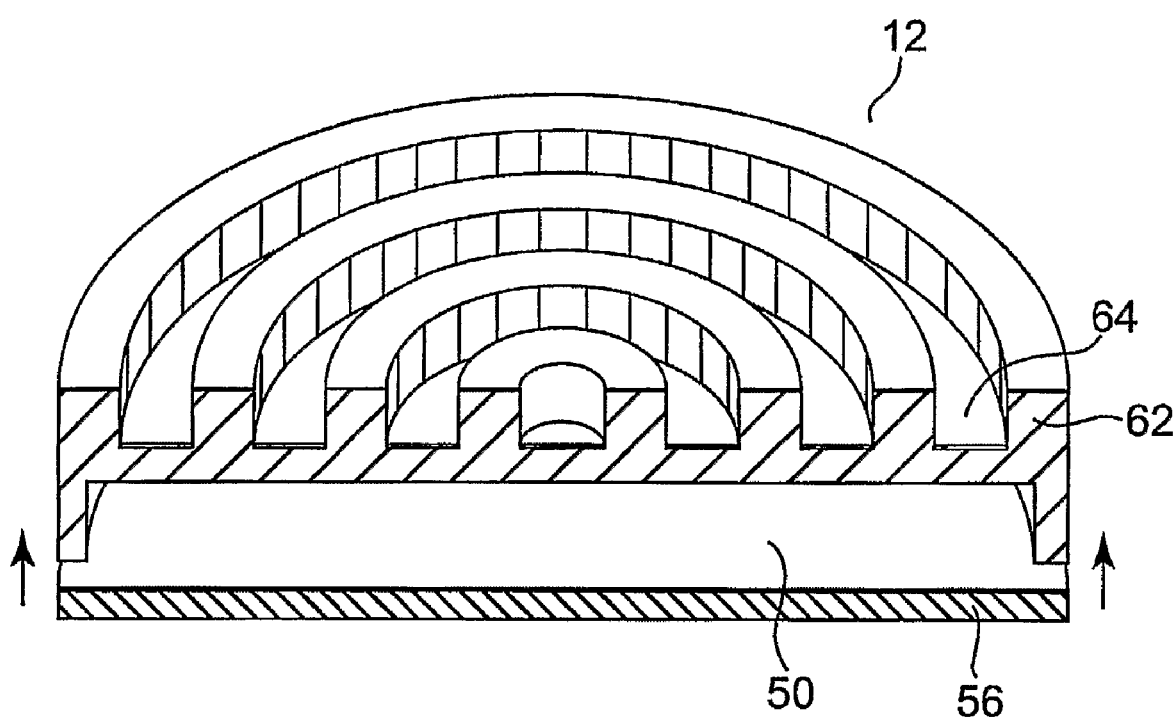
FIG. 9 is a perspective, cross-section view of an embodiment of the plate heat exchanger using a spiral channel pattern in the circular exchange element.

An alternate embodiment of the plate heat exchanger is shown in FIG. 9, which provides a perspective, cross-section view of a plate heat exchanger 12 using a spiral channel pattern in the planar exchange element 52. In the embodiment shown, the plate heat exchanger 12 has a cover plate 56 mounted on the bottom to form a channel for engine coolant when attached to the circular exchange element 62. Note that the circular exchange element 62 does not need to be strictly circular, and may be, for example, oval in shape. The circular exchange element 62, as shown, contains a relatively large cavity on one side, used to form a coolant channel 50, and a spiral pattern trench 64 on the other side. The coolant channel 50 may be provided with pillars or other obstructions if desired to slow, agitate, and/or redirect hot engine coolant as it passes through the channel. If you increase the sectional area through which the hot engine coolant flows, the velocity will drop, so the various obstacles positioned within the channel also serve to maintain coolant flow velocity.

The spiral pattern trench 64 will be covered with an additional cover plate 56 in order to form enclosed channels through which the washer fluid can flow. A spiral design provides very efficient use of space, and has the advantage of turning in a continuous arc rather than more abrupt 90° or 180° turns. This channel structure encourages rolling and tumbling turbulence of the washer fluid, which both increases the rate of heat transfer and results in the plate heat exchanger 12 having a self-cleaning aspect. As with the other embodiment of the plate heat exchanger 12 described above, a plate heat exchanger using a spiral channel pattern can be provided with several, modular layers for greater lineal distance. The spiral channel pattern will require washer fluid inlet 26 and outlets 28, one of which will be positioned at one end of the spiral on the periphery of the circular exchange element 62, with the other positioned at or near the center of the circular exchange element 62.

Figure 10:
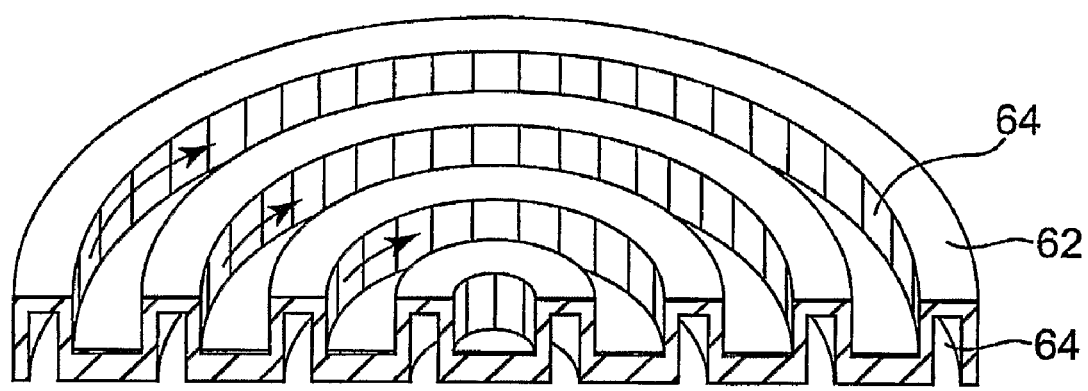
FIG. 10 is a perspective, cross-section view of an embodiment of a circular exchange element with a double spiral channel pattern.

An additional embodiment is shown in FIG. 10, which provides a perspective, cross-section view of a circular exchange element with a double spiral channel pattern. As noted above regarding FIG. 9, barriers and pillars may be added to the coolant channel 50 in order to create turbulence and maintain the velocity of the hot engine coolant passing through the channel. An even better way to approach this problem is to direct engine coolant through a spiral pattern in the same manner used on the other side of the circular exchange element 62 for the washer fluid. Preferably, the two spiral flows run in opposite directions, such that the fluid enters one spiral channel from the middle while the other fluid enters its spiral channel from the periphery. Thus, a circular exchange element 62 with a double spiral channel pattern will have a spiral pattern trench 64 on one side, and another spiral pattern trench 64 on the other side. Addition of a cover plate 56 to each side seals the trenches, forming spiral channels. The amount of surface area contacting the two fluids is maximized in this arrangement, the distance through which heat must travel minimized, and the same piece of material is contacting both fluids, resulting in a very efficient heat exchange mechanism for this and for other reasons such as increased turbulence and counter-directional flow.

Figure 11:
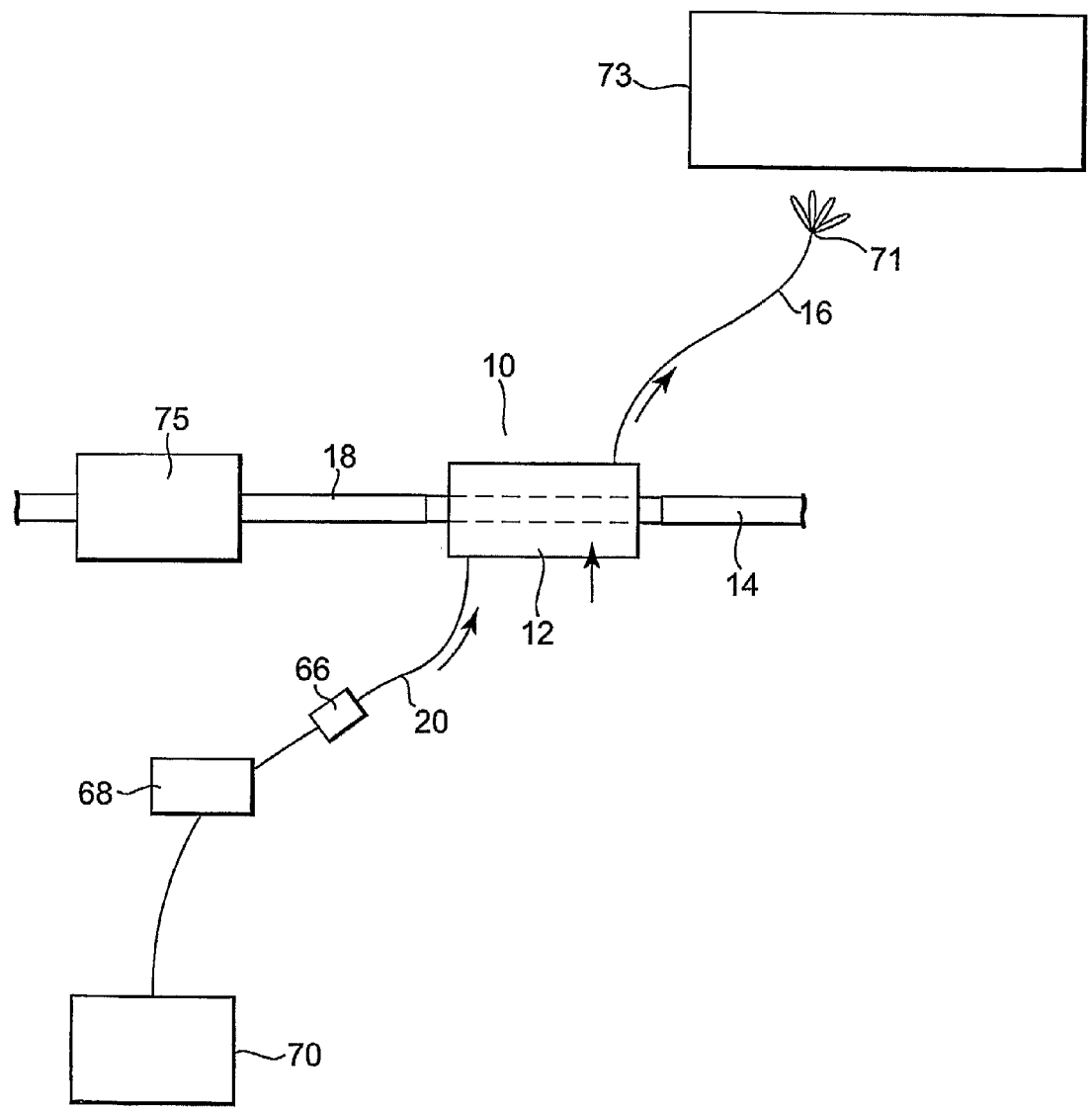
FIG. 11 is a diagrammatic side view of an embodiment of the washer fluid heating system of the present invention with a check valve.
Figure 12:
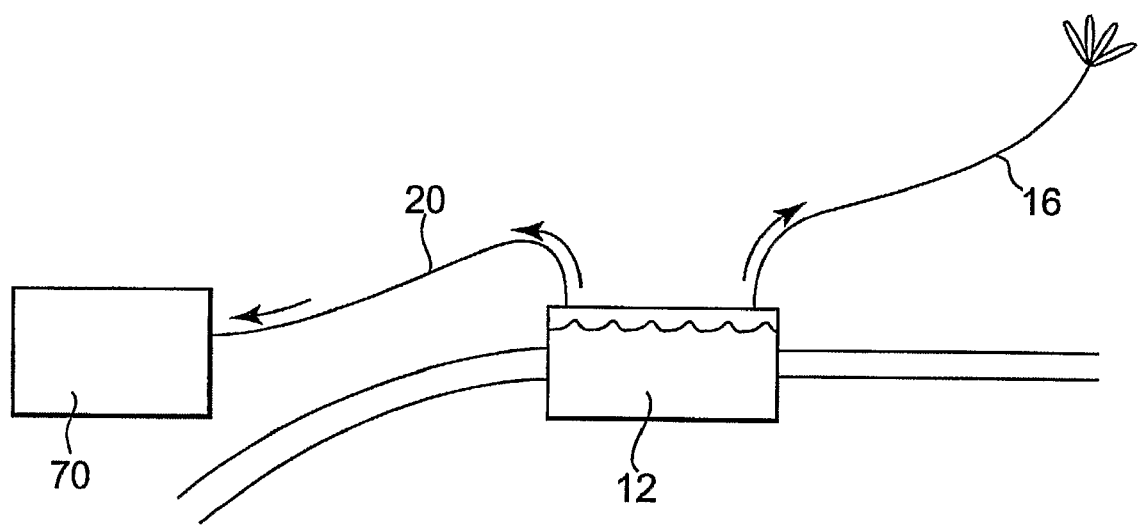
FIG. 12 is a diagrammatic side view of an embodiment of the washer fluid heating system of the present invention with the inlet and outlet positioned on top of the heat exchanger.
Figure 13:
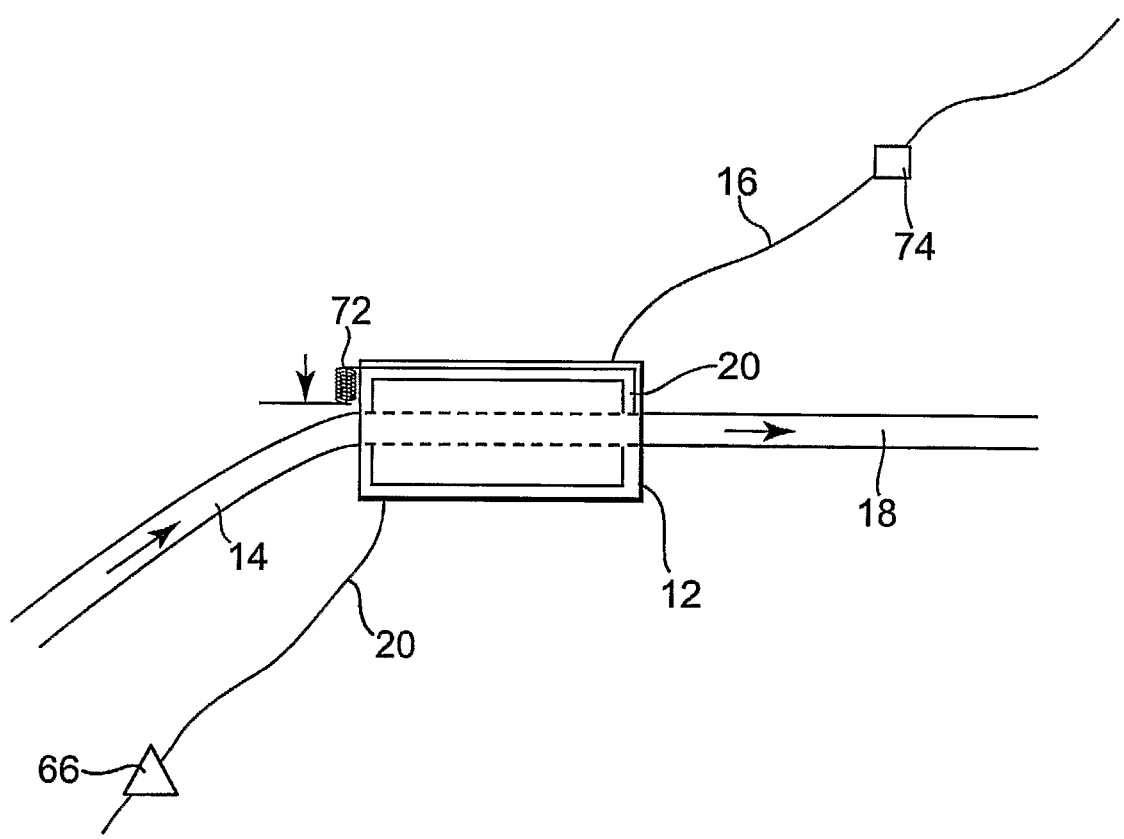
FIG. 13 is a diagrammatic side view of an embodiment of the washer fluid heating system of the present invention including a bypass system and pressure valve.

FIGS. 11-13 return to embodiment of a washer fluid heating system 10 as a whole, describing various devices and layouts that can be used to facilitate control of the heat exchanger 12. FIG. 11 is a diagrammatic side view of an embodiment of the washer fluid heating system 10 of the present invention with a check valve 66. As described for FIG. 1 above. The heat exchanger 12 conducts heat from engine coolant that flows into the heat exchanger 12 along an engine coolant inflow line 14 to the washer fluid that then flows outwards through a washer fluid outflow line 16. Engine coolant leaves the heat exchanger 12 along an engine coolant outflow line 18. Engine coolant is propelled through the system by an engine coolant pump 75, which may be found at various locations within the engine coolant system. Washer fluid flows into the heat exchanger 12 along a washer fluid inflow line 20.

FIG. 11 further illustrates the washer heater system 10 in the context of other vehicle components. First, the figure includes a check valve 66, either along the washer fluid inflow line 20 or at the point where washer fluid flows into the heat exchanger 12. The check valve 66 prevents fluid from backflowing out of the heat exchanger 12, thus forcing the fluid to remain in the heat exchanger 12 where it continues to be exposed to hot engine coolant. In this system, there is a constant flow of hot engine coolant through the heat exchanger 12. However, the washer fluid circuit is static unless the pump 68 for the washer fluid is activated. The pump 68 draws on washer fluid provided by the external reservoir 70. As there is no control valve on the washer fluid outflow line 16, heat and vapor can rise through this line and travel out onto the vehicle window 73 unimpaired. Washer fluid, when activated, flows out of the washer fluid outflow line 16 through the nozzles 71 and out onto the window. The flow of hot vapor onto the vehicle window 73 even when washer fluid is not expelled helps to maintain the window at a warmer temperature to help assure that when hot washer fluid first flows out onto the window it is even less likely to freeze on contact.

FIG. 12 is a diagrammatic side view of an embodiment of the washer fluid heating system 10 of the present invention with the inlet and outlet positioned on top of the heat exchanger 12. The overall arrangement is similar to that described above in FIG. 11. However, this embodiment of the washer fluid heating system 10 does not have a check valve 66. Furthermore, both the inlet and outlets, leading to the washer fluid inflow line 20 and the washer fluid outflow line 16, respectively, are positioned at the top of the heat exchanger 12, as installed. Excess heat and vapor in this system thus flows out along both lines. This warms the window, as described above in FIG. 11, and further warms the washer fluid present in the external reservoir 70. By prewarming the washer fluid in the external reservoir, washer fluid can be warmed more quickly to the desired temperature.

FIG. 13 is a diagrammatic side view of an embodiment of the washer fluid heating system 10 including a bypass system and pressure valve 74. Unlike the more open systems described in FIGS. 11 and 12, this embodiment of the invention is relatively closed. A check valve 66 is present at the washer inlet point, or along the washer fluid inflow line 20, preventing backflow of washer fluid out of the heat exchanger 12. A pressure valve 74 is present on the washer fluid outflow line 16, or at the point where washer fluid leaves the heat exchanger 12. The pressure valve 74 should generally have a pressure resistance that is less than the psi generated from the vehicles washer pump. As the washer fluid is heated and heat begins to rise from the liquid, the internal pressure of the washer fluid within the heat exchanger 12 will increase since there is nowhere for the heated air or vapor to go. The increased heat and pressure in the heat exchanger 12 actuates a thermal actuator 72 that uses a piston or slide device, for example, to move to increase the volume within the heat exchanger 12, thereby reducing the pressure. Movement initiated by the thermal actuator 72 also blocks or restricts the coolant from entering the primary heating circuit of the device. Restriction of coolant entry can entail a complete shut off, reduction, or bypass of the heat exchanger 12 by the engine coolant.

In one embodiment, a thermal actuator is placed in the channel of the coolant circuit. At a predetermined temperature, the actuator activates a valve that restricts the coolant from traveling through the coolant chamber and redirects the coolant to a bypass circuit around the primary circuit of the heat exchanger 12. A wiper style valve can be used where a small movement of the actuator creates a larger radial movement of the shutoff valve.

A further embodiment of the washer fluid heating system 10 shown in FIG. 13 uses vapor pressure on an opposing predetermined spring tension to actuate a piston instead of using a thermal actuator. In the washer fluid circuit of the heat exchanger 12, a pressure valve is placed on the outlet side, or along the outflow line 16 with a predetermined pressure release. The spring tension of the piston is less than that of the pressure valve on the outlet side of the heat exchanger 12. As washer fluid is heated, pressure will rise until the piston is actuated and the bypass activated, routing engine coolant away from the primary coolant passage to a bypass passage that does not heat the washer fluid. This will cause the washer fluid within the heat exchanger 12 to cool. This, in turn, causes the pressure inside the washer fluid circuit to drop and the piston to return to its initial position. Engine coolant will then again flow through the primary coolant passage of the heat exchanger 12. The pressure/piston system will automatically regulate the temperature of the washer fluid regardless of the altitude or the boiling point of the particular washer fluid being used. When the washer fluid pump is activated by the driver to pressurize the washer fluid circuit, the pressure overcomes the pressure valve 74, causing the valve to open and washer fluid to flow onto the window.

The present invention is intended to use along with a wiper system installed in the vehicle as a safety feature. A system generally consist of an external reservoir 70 to hold the washer fluid, a pump 68 to generate pressure to expel washer fluid from the heat exchanger 12, fluid lines to transport the washer fluid from the heat exchanger 12 to an area near the window or wiper blades, one or more nozzles that direct the washer fluid into a desired area of the window, one or more wiper blades powered by a motor, causing them to sweep over a portion of the window, a point of contact between the blades and the glass surface, and an electrical switch positioned in the driver seat area of the vehicle. When cleaning is required, the driver activates the switch that powers the pump to create pressure in the heat exchanger 12, forcing the liquid within to exit through an outlet, through a hose and nozzle(s) and onto the window. Generally, the same switch is used to activate both the wipers and the pump so that they act together.

Figure 14:
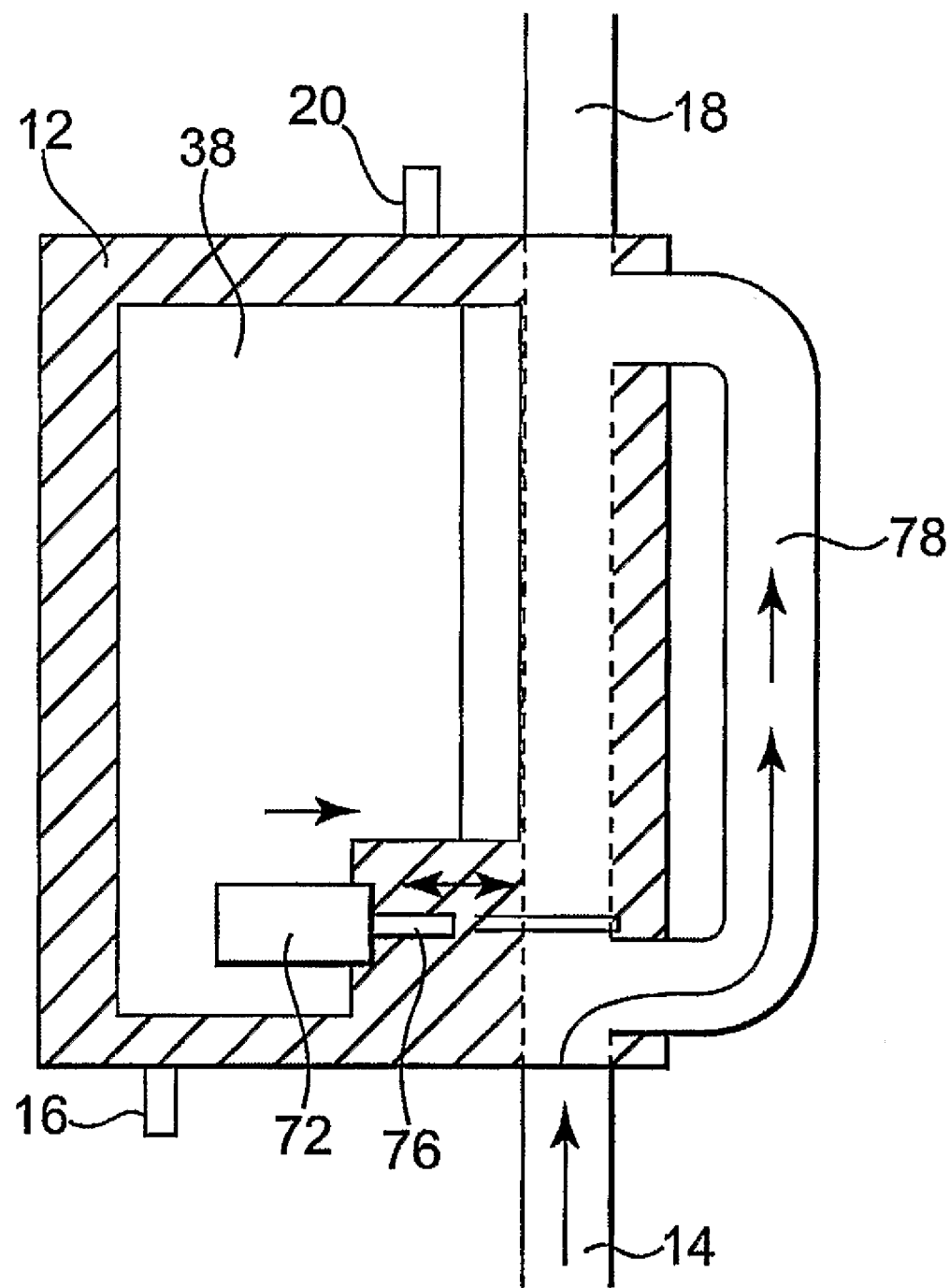
FIG. 14 is a cross-section view of the washer fluid heater including a thermal-actuated bypass system.

The details of the operation of the bypass system are further illustrated in FIG. 14, which shows a cross-section view of the heat exchanger 12 including a thermal-actuated bypass system. While FIG. 14 shows a heat exchanger 12 that includes a reservoir 38, the bypass system can be utilized regardless of whether or not a reservoir 38 is present. A thermal-actuator 72 is positioned within the heat exchanger 12 such that it can determine the temperature of the washer fluid within the reservoir 38. An effective thermal-actuator 72 is a wax paraffin actuator. As noted above, when the temperature of the washer fluid reaches a certain point, the thermal actuator 72 will activate an internal valve 76 that closes off the regular flowpath for the hot engine coolant, redirecting the coolant to flow through a bypass circuit 78. Once the hot coolant is directed away from regular flowpath, heat is no longer exchanged with the washer fluid and the temperature of the fluid will drop until the valve 76 deactivates.

Figure 15:
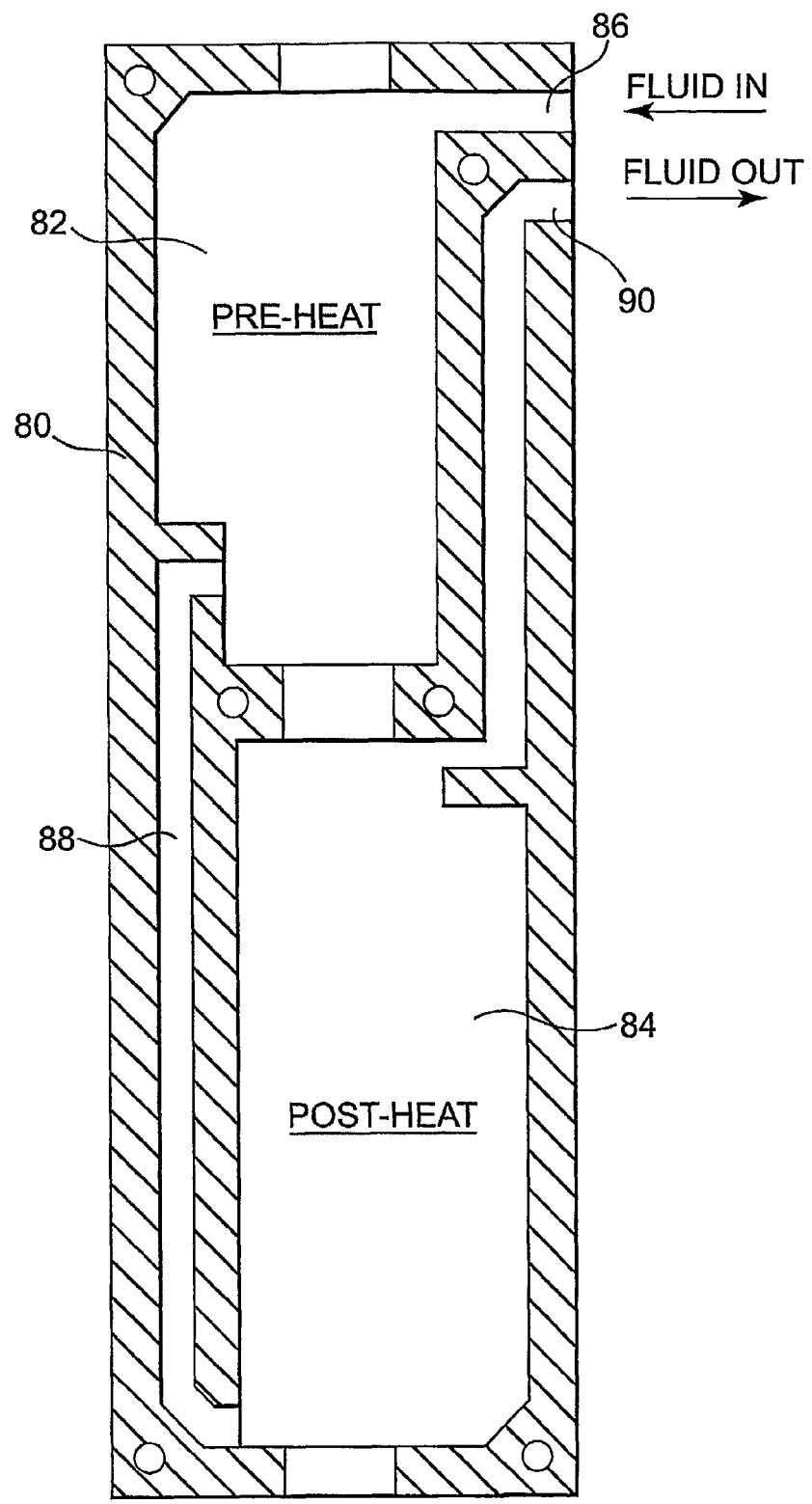
FIG. 15 is a cross-section view of a two-chambered heat exchanger according to an embodiment of the present invention.

FIG. 15 provides a cross-section view of a two-chambered heat exchanger 80 according to an embodiment of the present invention. Use of two chambers helps to prevent dilution of cold washer fluid as it enters the heat exchanger, as well as dilution of the already hot washer fluid with cold washer fluid. The two chambers are thus a pre-heat chamber 82, and a post-heat chamber 84. Washer fluid enters the two-chambered heat exchanger 80 at the pre-heat inlet 86. The washer fluid fills the pre-heat chamber 82, and then flows along a connector channel 88 to the post-heat chamber 84, from where it flows out through the post-heat outlet 90 when the washer pump is activated. The pre-heat inlet 86 and the post-heat outlet 90 are oriented so air or vapor can escape out of the highest point. One or both of the chambers may be provided with fins or piping to provide greater surface area. Both of the chambers are exposed to heat provided by flow of hot engine coolant (not shown).

Figure 16:
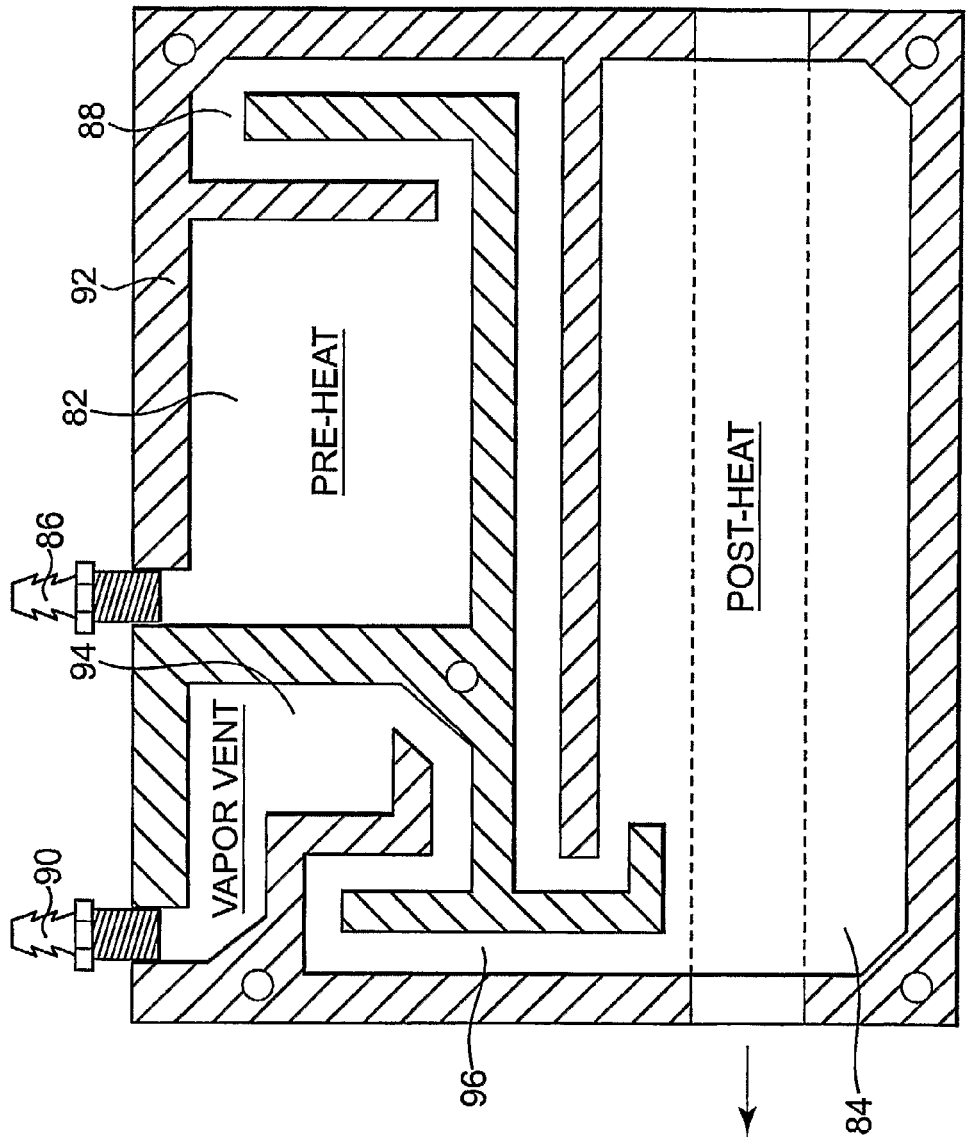
FIG. 16 is a cross-section view of a three-chambered heat exchanger including a vapor vent according to an embodiment of the present invention.

FIG. 16 is a cross-section view of a three-chambered heat exchanger including a vapor vent according to an embodiment of the present invention. The three chambered heat exchanger 92 thus includes a pre-heat chamber 82, a post-heat chamber 84, and a vapor vent chamber 94. Unlike the two-chambered heat exchanger 80, only one chamber is directly adjacent to the flow of hot engine coolant. This is the post-heat chamber 84. Washer fluid enters the three-chambered heat exchanger 92 at the pre-heat inlet 86. The washer fluid fills the pre-heat chamber 82, and then flows along a connector channel 88 to the post-heat chamber 84, from where it flows out through the vapor vent line 96 to the vapor vent chamber and then out through the post-heat outlet 90 when the washer pump is activated. While the pre-heat chamber 82 is not directly adjacent to the flow of hot engine coolant, the mass of the three-chambered heat exchanger 92 is generally warmed by the nearby flow of hot engine coolant, so significant warming will still occur in this chamber. In this system, hot vapor will rise out of both the post-heat outlet 90 and the pre-heat inlet 86, heating both the line leading to the window of the vehicle and the washer fluid of the external reservoir. The vapor vent chamber 94 is small so that there is less washer fluid as a percentage for the amount of vapor, which produces great heat transfer in the last compartment before it exits the device when the pump is actuated.

Figure 17:
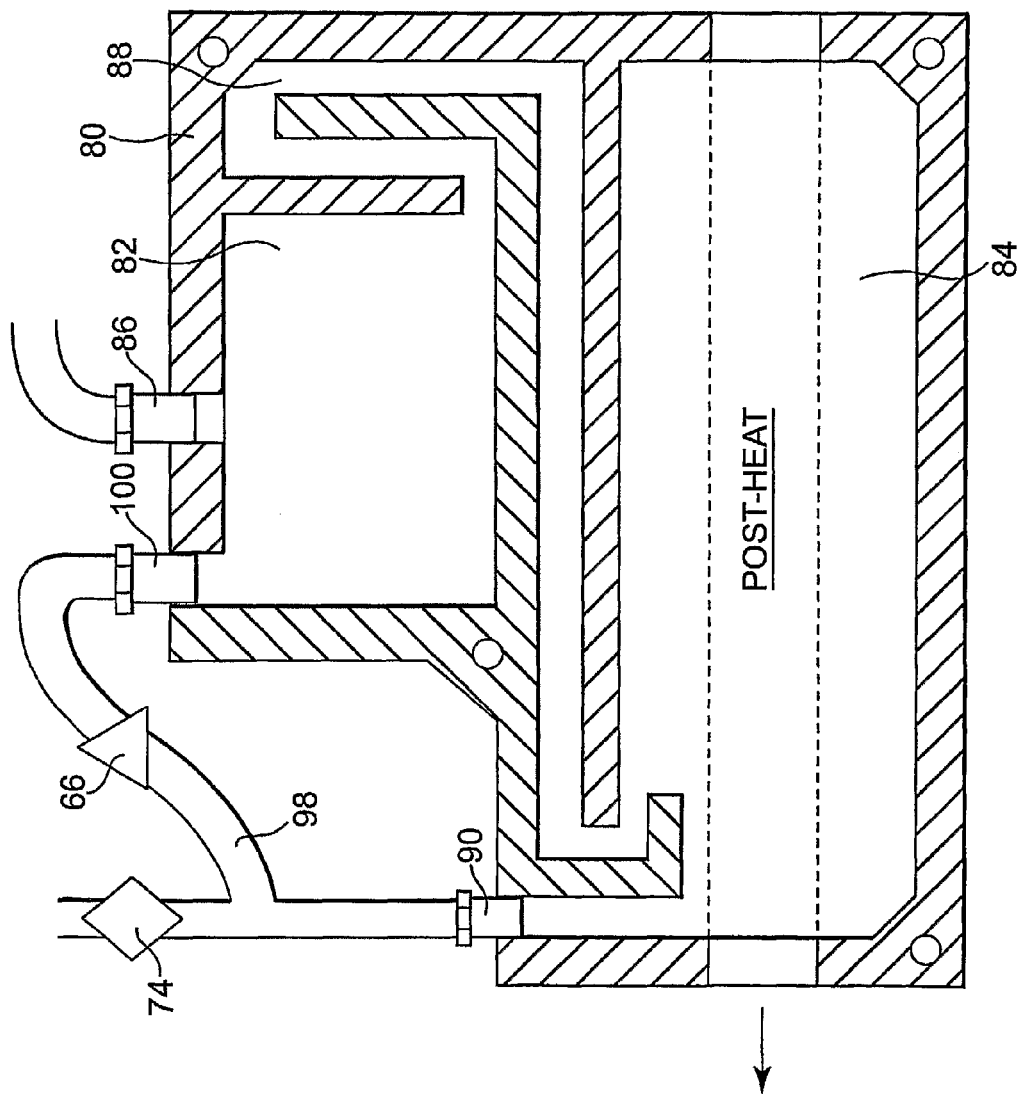
FIG. 17 is a cross-section view of a two-chambered heat exchanger with vapor recycling according to an embodiment of the present invention.

An alternate embodiment of the two-chambered heat exchanger 80 is shown in FIG. 17, which provides a cross-section view of a two-chambered heat exchanger 80 with vapor recycling. This embodiment represents somewhat of a combination of the previous two embodiments, as it is a two-chambered heat exchanger 80, but unlike the earlier two-chambered heat exchanger, only the post-heat chamber 84 is directly adjacent to the flow of hot engine coolant. Washer fluid is heated in the pre-heat chamber 82 only by the ambient heat that permeates the heat exchanger. When the pump has not been activated by the driver, vapor leaves through the post-heat outlet 90. It then encounters a pressure valve 74 that redirects flow of the vapor along a return line 98 to a return inlet 100 that enables the heated vapor to re-enter the pre-heat chamber 82 where it assists in elevating the temperature of the washer fluid. This creates a thermal cycle that will continue to flow until the pump is activated by the driver. However, when the pump is activated, the pressure rises past the limit of the pressure valve 74, closing the valve so that hot washer fluid flows out to the vehicle window rather than back into the pre-heat chamber 82. The return line 98, or alternately the return inlet 100, are provided with a check valve 66 to prevent washer fluid from flowing through the return line 98.

Figure 18:
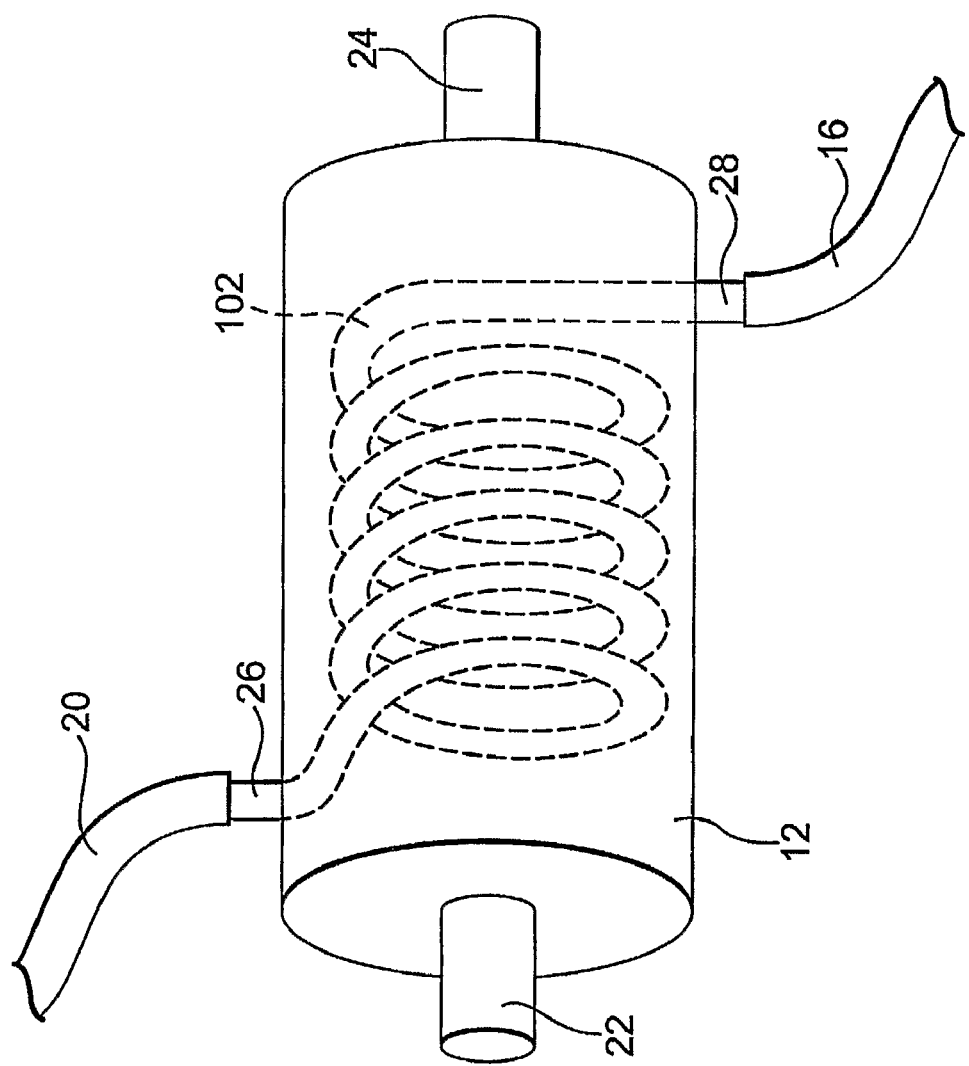
FIG. 18 is a diagrammatic side view of an embodiment of a heat exchanger with a washer fluid coil immersed in engine coolant.

An additional embodiment of the heat exchanger 12 is shown in FIG. 18, which illustrates a diagrammatic side view of a heat exchanger 12 with a washer fluid coil 102 immersed in engine coolant. Hot engine coolant flows through the heat exchanger 12, entering at the engine coolant inlet 22 and leaving at the engine coolant outlet 24. Washer fluid enters the heat exchanger at the washer fluid inlet 26, where it enters the washer fluid coil 102. The coil runs through the engine coolant, and then leaves the heat exchanger 12 at the washer fluid outlet 28. Preferably, the engine coolant flow and the washer fluid flow are in opposite directions, as counterflowing fluids have a greater velocity between them and hence a higher rate of heat transfer. However, counterflow is not necessary for operation of the invention.

Installation of the washer fluid heating system of the present invention is fairly simple, and is a helpful aspect of the present invention. Generally, the heat exchanger 12 of the present invention is installed into the vehicle's cooling system and the circuit for the vehicle's cabin heater, i.e. the heat core 30. The vehicle hose that carries engine coolant from the engine's cooling system to the heater core 30 is accessible and passes from the engine compartment through the vehicles firewall and into the interior. Cutting the heater hose, which will generally also be the engine coolant inflow line 14, allows the heat exchanger 12 to be inserted and connected via the engine coolant inlet 22 and the engine coolant outlet 24 with clamps or other attachment devices. Addition of the heat exchanger 12 does not compromise or significantly effect the function of the heating circuit. Since the fire wall divides the engine compartment from the vehicle's interior, it is generally located directly under the vehicles windshield. The washer fluid delivery lines installed by the vehicle's manufacturer are routed along the fire wall so that they can ultimately supply the nozzles located near the windshield. Cutting the washer fluid delivery line allows you to splice each end of this line onto the washer fluid inlet 26 and the washer fluid outlet 28 of the heat exchanger 12, thus requiring all washer fluid that passes from the external reservoir 30 to the windshield to pass through the heat exchanger 12. This is ideal, since the closer the device is installed to the point where the fluid exits the nozzles, the less cooling occurs from the point where the fluid leaves the device where it is heated to where it is distributed onto the windshield. No drilling or altering of the vehicle is thus required other than splicing into the engine coolant and washer fluid lines.

Figure 19:
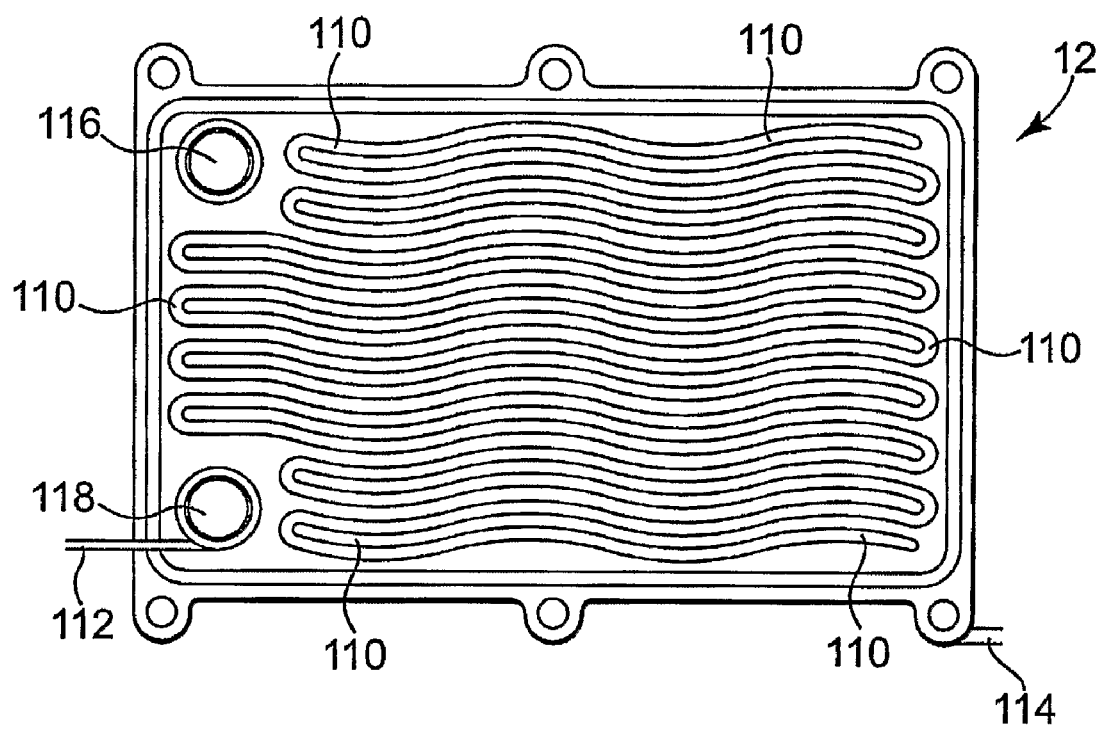
FIG. 19 is a top profile view of an embodiment of a heat exchanger using multiple wavy exchange elements.

With reference to FIG. 19, a top profile view of an embodiment of a heat exchanger using multiple wavy exchange elements is shown. In this additional embodiment, heat exchanger 12 can wavy fluid passages 110. Washer fluid enters through inlet passage 112 and exits through outlet passage 114, while coolant enters through inlet 116 and exits through outlet 118. In contrast to the design of FIG. 8 where the washer fluid travels through straight lineal passages, the fluid travels through wavy passages 110. In this design, the washer fluid is constantly moving around the curvy passages 110 so the fluid is always on a radius and not "laminar" straight. As the liquid moves through curvy passages 110 it is constantly mixing. This helps prevent scalding of the liquid since there is never continual contact between the ever changing liquid and the surface of passage 110.

This design helps improve thermal conductivity in several ways. First, the coolant is constantly mixing and therefore there are no cold spots within heat exchanger 12. Second, passages 110 have a longer lineal passage and thus greater time exposure to absorb heat. Third, passages 110 allow for the velocity of the coolant liquid to be accelerated. The inventor has observed that the temperature drop of the coolant as it traveled though the device was greater (e.g., more heat transferred to the washer fluid), thus the length of passages 110 could be shortened which allows for heat exchanger 12 to be made smaller while achieving the same output temperature.

Thus, embodiments of the WINDSHIELD HEAT AND CLEAN are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A window washing system for a motor vehicle, comprising:
   a nozzle located adjacent a vehicle window for directing washer fluid against the window;
   a washer fluid reservoir to contain a supply of washer fluid;
   a heat exchanger having an inlet connected to the washer fluid reservoir and an outlet connected to said nozzle, the heat exchanger having a coolant passage plate and a first wiper fluid plate, wherein
      the first wiper fluid plate and coolant passage plate are held together by a fastening means;
      the coolant passage plate allows the passage of coolant from the heat exchanger inlet to the heat exchanger outlet and
      the first wiper fluid plate contains a wiper fluid passage to route wiper fluid through the first plate to transfer heat from the engine coolant, the wiper fluid passage being in the form of a trench recessed in and defined by the first plate, wherein such a trench is only formed on one side of the first plate;
   pumping means for transferring washer fluid from said washer fluid reservoir into said heat exchanger and from said heat exchanger to said nozzle; and
   means for circulating coolant from a motor cooling system into the heat exchanger with the washer fluid inside to thereby heat the washer fluid.

2. The system of claim 1, wherein a second wiper fluid plate is held to the coolant passage plate by a fastening means.

3. The system of claim 2, wherein the coolant passage plate further comprises a wiper fluid passage for wiper fluid to pass from the first wiper plate to the second wiper plate.

4. The system of claim 3, wherein the coolant passage plate has a plurality of wiper fluid plates held to it by a fastening means.

5. The system of claim 4, wherein each wiper fluid plate has a cover plate to enclose the wiper fluid passages.

6. The system of claim 1, wherein the wiper fluid passage is a spiral trench.

7. The system of claim 1, wherein the wiper fluid passage contains imperfections to create fluid turbulence.

8. A washer fluid heater system configured to be installed in a motor vehicle having an engine and an engine coolant system, the washer fluid heater system being configured to heat washer fluid delivered to a windshield of the motor vehicle without drawing off battery power from the motor vehicle or otherwise using electricity, the washer fluid heating system comprising:
   a heat exchanger configured to be installed into the engine coolant system of the motor vehicle, the heat exchanger having a wiper fluid inlet to allow wiper fluid to enter the heat exchanger and a wiper fluid outlet to allow the wiper fluid to exit the heat exchanger, wherein a thermally-actuated bypass system is incorporated into the heat exchanger, the heat exchanger having a bypass passage;
   a coolant passage traversing through the heat exchanger having a coolant inlet and a coolant outlet, the coolant inlet and coolant outlet operably coupled to the engine coolant system to allow passage of engine coolant through the heat exchanger; and the heat exchanger's thermally-actuated bypass system including a thermal actuator positioned within the heat exchanger, the thermal actuator actuates a gate routing the engine coolant flow to the bypass passage from the coolant passage when the wiper fluid becomes too hot;

wherein the heat exchanger has a first chamber and a second chamber; and wherein the coolant inlet is operably coupled to the first chamber and the coolant outlet is operably coupled to the second chamber.

9. The apparatus of claim 8, wherein the wiper fluid flows into the first chamber and then flows into the second chamber.

10. The apparatus of claim 8, wherein the first chamber pre-heats the wiper fluid and the second chamber heats the wiper fluid to a useable level.

11. The apparatus of claim 10, wherein the coolant passages traverses through the first and second chamber.

12. The apparatus of claim 8, wherein the heat exchanger further comprises a third chamber.

13. The apparatus of claim 12, wherein the coolant passage traverses through the first chamber.

14. The apparatus of claim 13, wherein the wiper fluid inlet is operably coupled to the second chamber where the wiper fluid is pre-heated by the first chamber.

15. The apparatus of claim 14, wherein the wiper fluid outlet is operably coupled to the third chamber where the wiper fluid remains heated by the first chamber.

16. The apparatus of claim 15, wherein the first chamber is smaller than the second chamber.

17. A washer fluid heater system configured to be installed in a motor vehicle having an engine and an engine coolant system, the washer fluid heater system being configured to heat washer fluid delivered to a windshield of the motor vehicle without drawing off battery power from the motor vehicle or otherwise using electricity, the washer fluid heating system comprising:

a heat exchanger configured to be installed into the engine coolant system of the motor vehicle, the heat exchanger having a wiper fluid inlet to allow wiper fluid to enter the heat exchanger and a wiper fluid outlet to allow the wiper fluid to exit the heat exchanger, wherein a thermally-actuated bypass system is incorporated into the heat exchanger, the heat exchanger having a bypass passage;

a coolant passage traversing through the heat exchanger having a coolant inlet and a coolant outlet, the coolant inlet and coolant outlet operably coupled to the engine coolant system to allow passage of engine coolant through the heat exchanger; and the heat exchanger's thermally-actuated bypass system including a thermal actuator positioned within the heat exchanger, the thermal actuator actuates a gate routing the engine coolant flow to the bypass passage from the coolant passage when the wiper fluid becomes too hot;

wherein the heat exchanger has a first chamber and a second chamber;

wherein the coolant passage is only directly adjacent to the second chamber; and wherein the wiper fluid inlet is operably coupled to the first chamber where the wiper fluid is pre-heated by the first chamber.

18. The apparatus of claim 17, wherein the wiper fluid outlet is operably coupled to the second chamber.

19. The apparatus of claim 17, further comprising a pressure valve coupled to the wiper fluid outlet.

20. The apparatus of claim 19, further comprising a return line that enables heated vapor to enter the first chamber.

* * * * *